(No Model.)

I. S. BRANDENBURG & H. H. WOGAMAN.
FERTILIZING MACHINE.

No. 413,124. Patented Oct. 15, 1889.

Witnesses.
Lillie Hanna
George S Bell

Inventors
Isaac S Brandenburg and
Harry H. Wogaman
By Knight Bros.
Attorneys.

UNITED STATES PATENT OFFICE.

ISAAC S. BRANDENBURG, OF PEORIA, ILLINOIS, AND HARRY H. WOGAMAN, OF JOHNSVILLE, OHIO.

FERTILIZING-MACHINE.

SPECIFICATION forming part of Letters Patent No. 413,124, dated October 15, 1889.

Application filed February 9, 1889. Serial No. 299,236. (No model.)

*To all whom it may concern:*

Be it known that we, ISAAC S. BRANDENBURG and HARRY H. WOGAMAN, citizens of the United States, residing, respectively, at Peoria, in the county of Peoria and State of Illinois, and at Johnsville, in the county of Montgomery and State of Ohio, have invented certain new and useful Improvements in Fertilizing-Machines, of which the following is a specification.

This invention relates to certain improvements in means for transporting, cutting, and distributing manure, and is adapted to be attached to the drill-boxes of ordinary sowing-machines.

Figure 1:
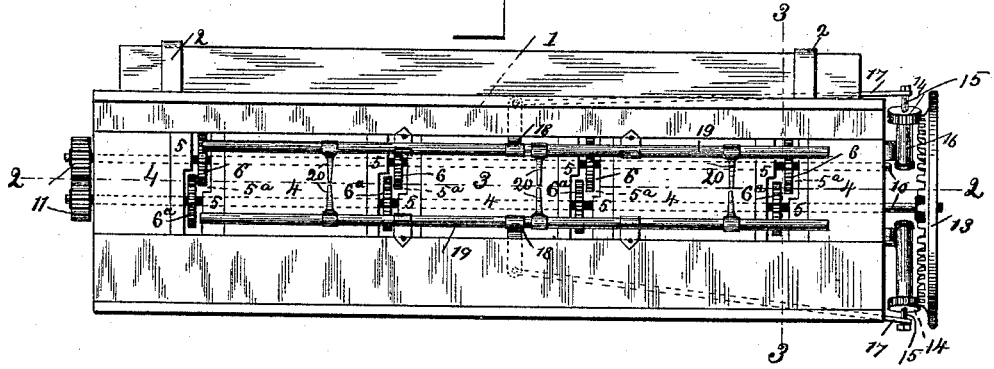
Figure 2:
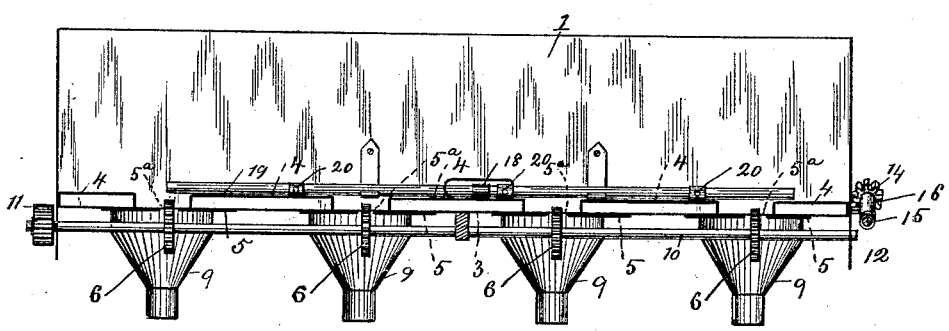
Figure 3:
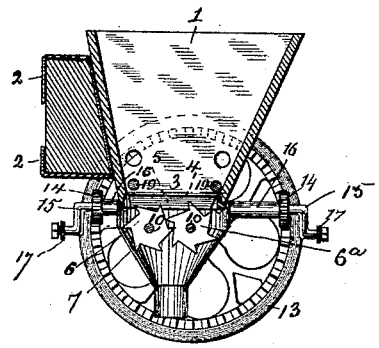

Referring to the accompanying drawings, which form a part of this specification, Figure 1 represents a plan view. Fig. 2 is a longitudinal section on the line 2 2, Fig. 1. Fig. 3 represents a cross-section on the line 3 3, Fig. 1.

In these drawings, 1 represents an oblong hopper-shaped box for the purpose of holding the manure or fertilizing material, and is provided at one side with hooks or clamps 2, which may be attached or connected with the drill-box of a sowing machine or apparatus.

The bottom 3 of the manure or fertilizing hopper is divided into sections, as shown in Fig. 1. These sections consist of raised portions 4 and depressed portions 5. In the latter are stepped openings 5ª, in which are set in pairs rotating wheel-shaped cutters 6 6ª, provided with knives or teeth 7 on their peripheries, which cutters rotate in the slots in the depressed portions 5. As the manure or fertilizing material is fed into the depressed portions or cavities 5, the rotating cutters, being so arranged as to turn toward each other and toward the center of the hopper, will attach themselves to the substance within the hopper, and will cause it to be drawn down through the openings or slots aforesaid. This action will bring the fertilizing material into the funnels 9, as shown in Figs. 2 and 3. These funnels extend downwardly beneath the bottom of the oblong hopper and may be of any number desired. In the drawings we have shown four; but these may be lessened or increased, as may be preferred in various cases.

The rotating cutters are mounted on longitudinal shafts 10, which extend, preferably, the entire length of the hopper, and which are geared to each other at their outer ends by means of intermeshing cog-wheels 11, and at the other end set and rotating in the wing or flange 12, which forms a part of or is attached to the end of the said hopper. One of said shafts is provided with a large gear-wheel 13, said wheel being adapted to receive power from any suitable source and to communicate it not only to the shafts aforesaid, but to the pinions 14, arranged on either side of said wheel. The pinions 14 are provided with shafts 15, suitably hung in the brackets 16, located upon the end of the hopper, and at their outer ends are formed into bell-cranks, to which are attached the long reciprocating arms 17, which extend inwardly and are connected by means of short fingers 18 with the sliding agitators 19. These agitators have projections 20, and are adapted to move in opposite directions by virtue of the connection through the pinions and cog-gearing aforesaid—that is to say, when one agitator is moving forward the other is moving in the opposite direction, the object being to keep the manure or fertilizing material in constant motion, to prevent it from bunching or clogging. As before stated, the driving-wheel 13 may receive motion from any suitable source; but we preferably connect it to the grain-drill wheel.

The hopper is so constructed and arranged as that when not needed it can be easily removed from the drill-box and as easily attached thereto when required.

With the cutters described we are enabled to feed material such as manure, corn-cobs, and tobacco-stalks.

Having thus described our invention, the following is what we claim as new therein and desire to secure by Letters Patent:

1. In a fertilizing-machine for attachment to a grain-drill, &c., the combination of a suitable hopper or receptacle for containing the fertilizing material, having stepped openings through the bottom connected with funnels, as shown, and pairs of oppositely-rotating cutters located in the openings between the hopper and the funnels for cutting the material and feeding it into the funnels, as set forth.

2. In a fertilizing-machine for attachment to a grain-drill, &c., the combination of a hopper constructed substantially as shown and described, the pairs of oppositely-rotating cutters located in stepped openings in the bottom of the hopper, and reciprocating agitators within the hopper for feeding the material to the cutters.

3. The combination of the hopper or receptacle provided with stepped openings in the bottom thereof, the funnels located beneath the openings, the pairs of oppositely-rotating cutters constructed substantially as shown and described, the reciprocating agitators, and the means for operating the agitators and the cutters, substantially as and for the purposes set forth.

4. In a fertilizing-machine, the combination of an oblong hopper provided with clamps or hooks for attachment to the grain-drill, stepped openings in the bottom of said hopper, funnels located beneath said openings, and mechanism for feeding the fertilizing material in the direction of the openings, and pairs of oppositely-rotating cutters for forcing the same into the funnels.

ISAAC S. BRANDENBURG.
HARRY H. WOGAMAN.

Witnesses:
GEO. M. LANE,
ALBERT KERN.